(12) United States Patent
Russell et al.

(10) Patent No.: US 10,399,032 B2
(45) Date of Patent: Sep. 3, 2019

(54) PRESSURE SWING ADSORPTION PROCESS AND APPARATUS FOR PURIFYING A HYDROGEN-CONTAINING GAS STREAM

(71) Applicant: UOP LLC, Des Plaines, IL (US)

(72) Inventors: Bradley P. Russell, Wheaton, IL (US); Kirit M. Patel, Winfield, IL (US); Henry Rastelli, Gurnee, IL (US)

(73) Assignee: UOP LLC, Des Plains, IL (US)

( * ) Notice: Subject to any disclaimer, the term of this patent is extended or adjusted under 35 U.S.C. 154(b) by 139 days.

(21) Appl. No.: 15/787,661

(22) Filed: Oct. 18, 2017

(65) Prior Publication Data

US 2018/0036671 A1 Feb. 8, 2018

Related U.S. Application Data

(63) Continuation of application No. PCT/US2016/051572, filed on Sep. 14, 2016.
(Continued)

(51) Int. Cl.
*B01D 53/047* (2006.01)
*C01B 3/56* (2006.01)
(Continued)

(52) U.S. Cl.
CPC ............ *B01D 53/047* (2013.01); *B01J 20/18* (2013.01); *B01J 20/20* (2013.01);
(Continued)

(58) Field of Classification Search
CPC ............ B01D 53/047; B01D 2253/102; B01D 2253/1085; B01D 2256/16;
(Continued)

(56) References Cited

U.S. PATENT DOCUMENTS 4,775,396 A 10/1988 Rastelli et al.
6,245,127 B1 6/2001 Kane et al.
(Continued)

FOREIGN PATENT DOCUMENTS

EP 1954380 A2 8/2008
JP 2013170102 A 9/2013

OTHER PUBLICATIONS

Harlick, "Equilibrium Analysis of Cyclic Adsorption Processes: CO2 Working Capacities with NaY", Separation Science and Technology, (2005) 40:13, 2569-2591.
(Continued)

*Primary Examiner* — Frank M Lawrence, Jr.

(57) ABSTRACT

Process and apparatuses for purifying a feed stream containing $CO_2$ and predominantly hydrogen are provided. In an embodiment, the process includes passing the feed stream through a multilayer adsorbent bed comprising a first adsorbent section, a second adsorbent section downstream from the first adsorbent section and a third adsorbent section downstream from the second adsorbent section. The first adsorbent section comprises an activated carbon layer, the second adsorbent section comprises a layer of molecular sieve of the faujasite structure type with a Si/Al atomic ratio of from 1.5 to 8.0 and the third adsorbent section comprises a layer of molecular sieve of the faujasite structure type with a Si/Al atomic ratio of from 1.0 to 1.5. At least one of $N_2$, $CO_2$, $CH_4$ and CO is adsorbed from the feed stream and a purified hydrogen product is recovered from the multilayer adsorbent bed.

20 Claims, 3 Drawing Sheets

Related U.S. Application Data

(60) Provisional application No. 62/219,416, filed on Sep. 16, 2015.

(51) Int. Cl.
  *B01J 20/18* (2006.01)
  *B01J 20/20* (2006.01)
  *B01J 20/28* (2006.01)

(52) U.S. Cl.
  CPC .......... *B01J 20/28052* (2013.01); *C01B 3/56* (2013.01); *B01D 2253/102* (2013.01); *B01D 2253/1085* (2013.01); *B01D 2256/16* (2013.01); *B01D 2257/102* (2013.01); *B01D 2257/502* (2013.01); *B01D 2257/504* (2013.01); *B01D 2257/7025* (2013.01); *B01D 2257/80* (2013.01); *B01D 2259/403* (2013.01); *B01D 2259/4005* (2013.01); *B01D 2259/40081* (2013.01); *B01D 2259/414* (2013.01); *B01D 2259/4146* (2013.01); *B01D 2259/4148* (2013.01); *C01B 2203/0233* (2013.01); *C01B 2203/047* (2013.01); *C01B 2203/0475* (2013.01); *Y02C 10/08* (2013.01); *Y02C 20/20* (2013.01); *Y02P 20/152* (2015.11); *Y02P 20/156* (2015.11)

(58) Field of Classification Search
  CPC ........ B01D 2257/102; B01D 2257/502; B01D 2257/504; B01D 2257/7025; B01D 2257/80; B01D 2259/4005; B01D 2259/40081; B01D 2259/403; B01D 2259/414; B01D 2259/4148; B01D 2259/4146; B01J 20/18; B01J 20/20; B01J 20/28052; C01B 3/56; C01B 2203/0233; C01B 2203/047; C01B 2203/0475; Y02C 10/08; Y02C 20/20; Y02P 20/152; Y02P 20/156
  USPC ....... 96/121, 132; 95/96, 139, 140, 130, 143
  See application file for complete search history.

(56) References Cited

U.S. PATENT DOCUMENTS

| | | | |
|---|---|---|---|
| 7,537,742 B2 | 5/2009 | Baksh et al. | |
| 7,556,671 B2 | 7/2009 | Jain et al. | |
| 7,618,478 B2 | 11/2009 | Kumar | |
| 8,591,627 B2 | 11/2013 | Jain | |
| 2002/0014153 A1* | 2/2002 | Baksh | B01D 53/047 95/96 |
| 2005/0257685 A1* | 11/2005 | Baksh | B01D 53/047 95/96 |
| 2007/0028770 A1* | 2/2007 | Tyndall | A61L 9/16 95/116 |
| 2008/0105122 A1* | 5/2008 | Leitgeb | B01D 53/02 95/116 |
| 2012/0174776 A1* | 7/2012 | Baksh | B01D 53/047 95/97 |
| 2013/0019750 A1* | 1/2013 | Baksh | B01D 53/047 95/97 |

OTHER PUBLICATIONS

Lee, "Adsorption Equilibria of CO2 on Zeolite 13X and Zeolite X/Activated Carbon Composite", J. Chem. Eng. Data 2002, 47, 1237-1242.
Ribeiro, "Activated carbon honeycomb monolith—Zeolite13X hybrid system to capture CO2 from flue gases employing Electric Swing Adsorption", Chemical Engineering Science 104 (2013) 304-318.
Search Report dated Dec. 1, 2016 for corresponding PCT Appl. No. PCT/US2016/051572.

* cited by examiner

PRESSURE SWING ADSORPTION PROCESS AND APPARATUS FOR PURIFYING A HYDROGEN-CONTAINING GAS STREAM

CROSS-REFERENCE TO RELATED APPLICATIONS

This application is a Continuation of copending International Application No. PCT/US2016/051572 filed Sep. 14, 2016 which application claims benefit of U.S. Provisional Application No. 62/219,416 filed Sep. 16, 2015, the contents of which cited applications are hereby incorporated by reference in their entirety.

TECHNICAL FIELD

The technical field generally relates to apparatuses and processes for purifying an impure gas stream predominantly containing hydrogen. More particularly, the technical field relates to pressure swing adsorption (PSA) apparatuses and processes for purifying impure gas streams predominantly containing hydrogen.

BACKGROUND

Pressure swing adsorption (PSA) processes provide an efficient and economical process for separating a multicomponent gas stream that contains at least two gases that have different adsorption characteristics. One of the gases may be preferentially adsorbed and can be an impurity that is separated from the other gas, which may be taken off as product. Alternatively, the gas that is preferentially adsorbed can be the desired product, which is separated from the other gas. For example, it may be desired to remove carbon dioxide, carbon monoxide, and light hydrocarbons from a hydrogen-containing feed stream to produce an impurity-depleted hydrogen (>99.9 mol % H2) stream for a hydrocracking or hydrotreating process where the impurities, especially carbon monoxide, could adversely affect the catalyst or the reaction.

In pressure swing adsorption processes, the multicomponent gas stream is typically fed to one or more adsorption beds at an elevated pressure to promote adsorption of at least one component, while at least one other component (for example, hydrogen) passes through the adsorption bed. At a defined time, feed to the adsorption bed is terminated and the adsorption bed is depressurized in one or more concurrent depressurization steps wherein pressure is reduced to a defined level that permits the separated, less-strongly adsorbed component or components to be withdrawn from the adsorption bed without significant desorption of the preferentially adsorbed components. Then, the adsorption bed is depressurized in a counter-current depressurization step (blowdown step) wherein the pressure in the adsorption bed is further reduced by withdrawing desorbed gas countercurrent to the direction of the multicomponent feed stream. Following the blowdown step, the bed is purged in a counter-current direction at a low pressure with a purified hydrogen stream to further desorb impurities, thereby creating a low-pressure tail gas stream. In multi-bed adsorption units, there are typically additional steps, and those noted above may be done in stages.

It is particularly desirable to minimize the amount of carbon dioxide and carbon monoxide in the impurity-depleted hydrogen streams. Conventionally, an activated carbon layer is used to remove carbon dioxide. However, still undesirable quantities of $CO_2$ migrate through the activated carbon layer. The migrated $CO_2$ interferes with the removal of other undesirable impurities such as CO and $N_2$ in the subsequent layers. Further, U.S. Pat. No. 4,775,396 teach using zinc or rare-earth exchanged faujasite molecular sieve for removing $CO_2$. However, this would entail significant cost.

Accordingly, it is desirable to provide methods and apparatuses for improving the removal of carbon dioxide in steam reforming based hydrogen PSA units and achieve net gain in performance. Further, it is desirable to provide a cost-effective method and apparatus that protects the sections subsequent to $CO_2$ removal section in a PSA unit from $CO_2$ migration and hence improve their efficiency in removing other impurities. Furthermore, other desirable features and characteristics of the present subject matter will become apparent from the subsequent detailed description of the subject matter and the appended claims, taken in conjunction with the accompanying drawings and this background of the subject matter.

BRIEF SUMMARY

Various embodiments contemplated herein relate to apparatuses and processes for purifying impure gas streams. The exemplary embodiments taught herein include apparatuses and processes for purifying impure gas streams predominantly containing hydrogen using pressure swing adsorption (PSA) apparatuses and processes.

In accordance with an exemplary embodiment, a multilayer adsorbent bed is provided for purifying a feed stream comprising $CO_2$, at least one of $N_2$, $H_2O$, $CH_4$ and CO, and more than 50 mole % hydrogen comprising a first adsorbent section, a second adsorbent section and a third adsorbent section. The first adsorbent section comprises an activated carbon layer and occupies a volume fraction of about 20 to about 50% of the multilayer adsorbent bed. The second adsorbent section comprises a layer of molecular sieve of the faujasite structure type with a Si/Al atomic ratio of from 1.5 to 8.0 and occupies a volume fraction of about 10 to about 25% of the multilayer adsorbent bed. The third adsorbent section comprises a layer of molecular sieve of the faujasite structure type with a Si/Al atomic ratio of from 1.0 to 1.5 and occupies a volume fraction of about 30 to about 60% of the multilayer adsorbent bed. Further, the second adsorbent section is present between the first adsorbent section and the third adsorbent section.

In accordance with another exemplary embodiment, a process is provided for purifying a feed stream comprising $CO_2$, at least one of $N_2$, $H_2O$, $CH_4$ and CO, and more than 50 mole % hydrogen, the process comprising passing the feed stream at an adsorption pressure of about 1500 kPa to about 3500 kPa, through a multilayer adsorbent bed comprising a first adsorbent section, a second adsorbent section downstream from the first adsorbent section and a third adsorbent section downstream from the second adsorbent section. The first adsorbent section comprises an activated carbon layer, the second adsorbent section comprises a layer of molecular sieve of the faujasite structure type with a Si/Al atomic ratio of from 1.5 to 8.0 and the third adsorbent section comprises a layer of molecular sieve of the faujasite structure type with a Si/Al atomic ratio of from 1.0 to 1.5. At least one of the $N_2$, $CO_2$, $CH_4$ and CO is adsorbed from the feed stream and a purified hydrogen product is recovered from the multilayer adsorbent bed.

In accordance with yet another exemplary embodiment, an apparatus is provided for purifying a feed stream comprising $CO_2$, at least one of $N_2$, $H_2O$, $CH_4$ and CO, and more than 50 mole % hydrogen. The apparatus comprises a feed end for the introduction of the feed stream thereto, a product end for the recovery of purified feed stream therefrom and a multilayer adsorbent bed comprising a first adsorbent section, a second adsorbent section downstream from the first adsorbent section and a third adsorbent section downstream from the second adsorbent section. The first adsorbent section comprises an activated carbon layer, the second adsorbent section comprises a layer of molecular sieve of the faujasite structure type with a Si/Al atomic ratio of from 1.5 to 8.0 and the third adsorbent section comprising a layer of molecular sieve of the faujasite structure type with a Si/Al atomic ratio of from 1.0 to 1.5.

BRIEF DESCRIPTION OF THE DRAWINGS

The various embodiments will hereinafter be described in conjunction with the following FIGURES, wherein like numerals denote like elements.

DEFINITIONS

As used herein, the term "stream" can include various hydrocarbon molecules and other substances.

As depicted, process flow lines in the FIGURES can be referred to interchangeably as, e.g., lines, pipes, feeds, gases, products, discharges, parts, portions, or streams.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "predominantly" means a majority, suitably at least 50 mol % and preferably at least 60 mol %.

The term "feed stream" as used herein includes the "hydrocarbon stream", as well as it may include a carrier fluid stream such as hydrogen, carbon dioxide, carbon monoxide, nitrogen, or any streams used in the systems and the processes described herein.

The term "adsorption" as used herein encompasses the use of a solid support to remove atoms, ions or molecules from a gas or liquid.

The term "Pressure swing adsorption (PSA)" refers to a process where a contaminant is adsorbed from a gas when the process is under a relatively higher pressure and then the contaminant is removed or desorbed thus regenerating the adsorbent at a lower pressure.

The term "atomic ratio" may be used interchangeably with "mole ratio".

The term "feeding" means that the feed passes from a conduit or vessel directly to an object without passing through an intermediate vessel.

The term "passing" includes "feeding" and means that the material passes from a conduit or vessel to an object.

As used herein, the term "kilopascal" may be abbreviated "kPa" and the term "megapascal" may be abbreviated "MPa", and all pressures disclosed herein are absolute.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
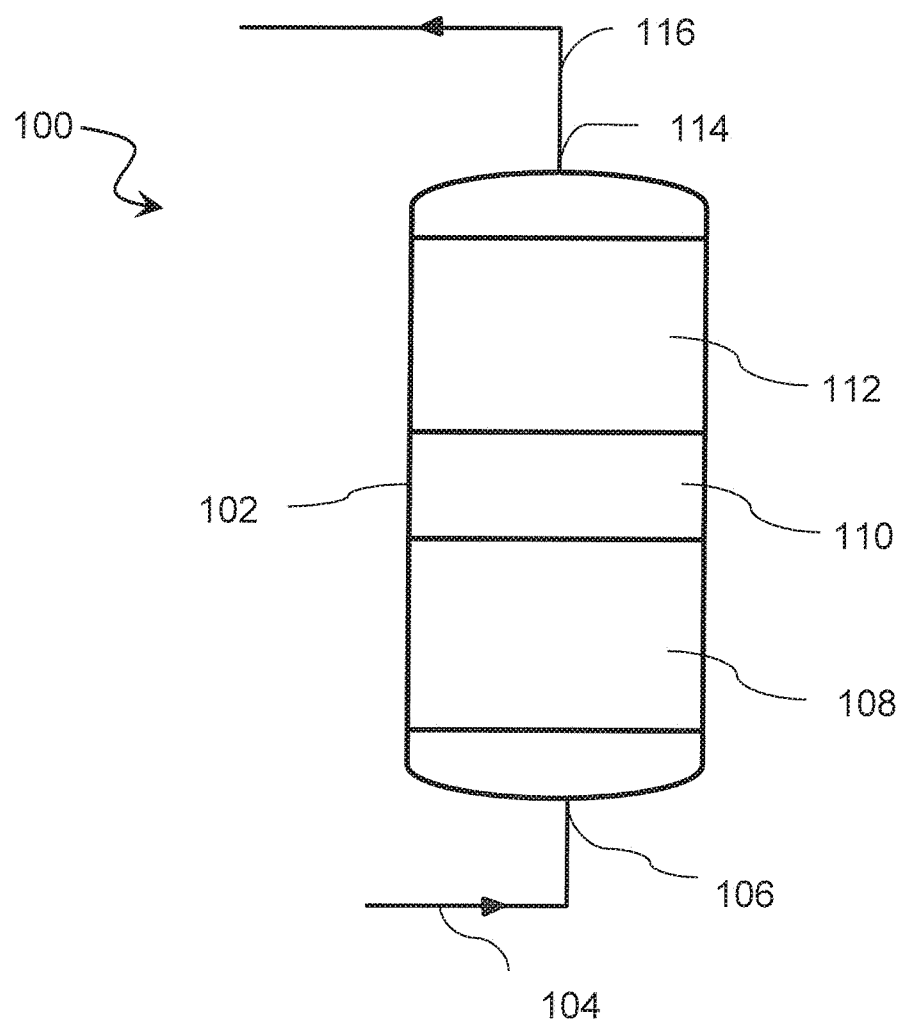
FIG. 1 illustrates a schematic of a three section PSA adsorption column in accordance with an exemplary embodiment of the invention.

An embodiment of a process and apparatus for purifying an impure gas stream is addressed with reference to a process and apparatus 100 for purifying the impure gas stream predominantly containing hydrogen as shown in FIG. 1. The process and apparatus 100 includes a multilayer adsorption bed 102, a feed stream 104 including the impure gas stream, a feed end 106, a first adsorbent section 108, a second adsorbent section 110, a third adsorbent section 112, a product end 114 and a product stream 116 including purified gas stream. The feed stream 104 is passed to the multilayer adsorbent bed 102 through the feed end 106. The feed stream 104 can be obtained from various sources. In one example, the feed stream 104 is an impure gas stream predominantly containing hydrogen obtained from steam reforming of light hydrocarbons, such as natural gas. In accordance with an exemplary embodiment, the feed stream 104 comprises predominantly hydrogen along with $CO_2$ and other impurities. Examples of the impurities present in the feed stream 104 include $N_2$, $H_2O$, $CH_4$ and CO. In one example, the feed stream 104 includes about 10 to about 20 mol % $CO_2$, about 1% to about 10 mol % $CH_4$, about 1 to about 10 mol % CO and no more than about 2 mol % $N_2$.

The feed stream 104 passes through the first adsorbent section 108. The first adsorbent section 108 includes an activated carbon layer and occupies a volume fraction of about 20 to about 50% of the multilayer adsorbent bed 102. In accordance with an exemplary embodiment, the first adsorbent section 108 occupies a volume fraction of about 45% of the multilayer adsorbent bed 102. The first adsorbent section 108 adsorbs at least one of $CO_2$ and $CH_4$ present in the feed stream 104. In accordance with various embodiments, one or more layers may be present in the first adsorbent section 108 for removal of $H_2O$ in the feed stream 104. In one example, the first adsorbent section 108 further includes at least one of a silica gel layer and an activated alumina layer upstream of the activated carbon layer in the first adsorbent section 108.

Subsequently, the feed stream 104 passes to the second adsorbent section 110. The second adsorbent section 110 includes a layer of a molecular sieve of the faujasite structure type with a Si/Al atomic ratio of from 1.5 to 8.0. In accordance with an exemplary embodiment, the second adsorbent section includes a NaY zeolite molecular sieve. The second adsorbent section 110 occupies a volume fraction of about 10 to about 25% of the multilayer adsorbent bed 102. In accordance with an exemplary embodiment, the second adsorbent section 110 occupies a volume fraction of about 15% of the multilayer adsorbent bed 102. The second adsorbent section 110 adsorbs at least $CO_2$ remaining in the feed stream 104 after passing through the first adsorbent section 108.

Thereafter, the feed stream 104 passes to the third adsorbent section 112. The third adsorbent section 112 includes a layer of molecular sieve of the faujasite structure type with a Si/Al atomic ratio of from 1.0 to 1.5. In accordance with an exemplary embodiment, the third adsorbent section 112 includes one of NaX molecular sieve and a CaX molecular sieve and combination thereof. In accordance with another exemplary embodiment, the third adsorbent section 112 includes one of a Linde Type A Zeolite in addition or in alternative to a NaX zeolite molecular sieve and a CaX zeolite molecular sieve and combinations thereof. In one example, the Linde Type A Zeolite is a 5 A molecular sieve. The third adsorbent section 112 occupies a volume fraction of about 30 to about 60% of the multilayer adsorbent bed 102. In accordance with an exemplary embodiment, the third adsorbent section 112 occupies a volume fraction of about 40% of the multilayer adsorbent bed 102. The third adsorbent section 112 adsorbs at least CO and $N_2$ present in the feed stream 104. After passing of the feed stream 104 through the various adsorbent sections, the product stream 116 including the purified gas stream is obtained from the product end 114. In accordance with the instant embodiment as discussed, the product stream 116 is purified hydrogen product with purity greater than about 99.9 mol %. In one example, the purified hydrogen product comprises no more than 10 ppmv CO.

Additionally, once the adsorbent bed becomes saturated with adsorbed impurities, the multilayer adsorbent bed 102 undergoes a regeneration step to desorb at least one $N_2$, $CO_2$, $CH_4$ and CO from the multilayer adsorbent bed 102. The desorption is performed by a reduction in pressure to a pressure lower than the adsorption pressure and by countercurrent purging with purified hydrogen at low pressure. The pressure is then increased to the adsorption pressure prior to the next cycle of purification of impure gas stream.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

Example

The following is an example of the hydrogen purification process, in accordance with an exemplary embodiment, that is similarly configured to the process and apparatus 100 illustrated in the FIG. 1. The example is provided for illustration purposes only and is not meant to limit the various embodiments of apparatuses and methods for purifying impure gas streams in any way.

Figure 2:
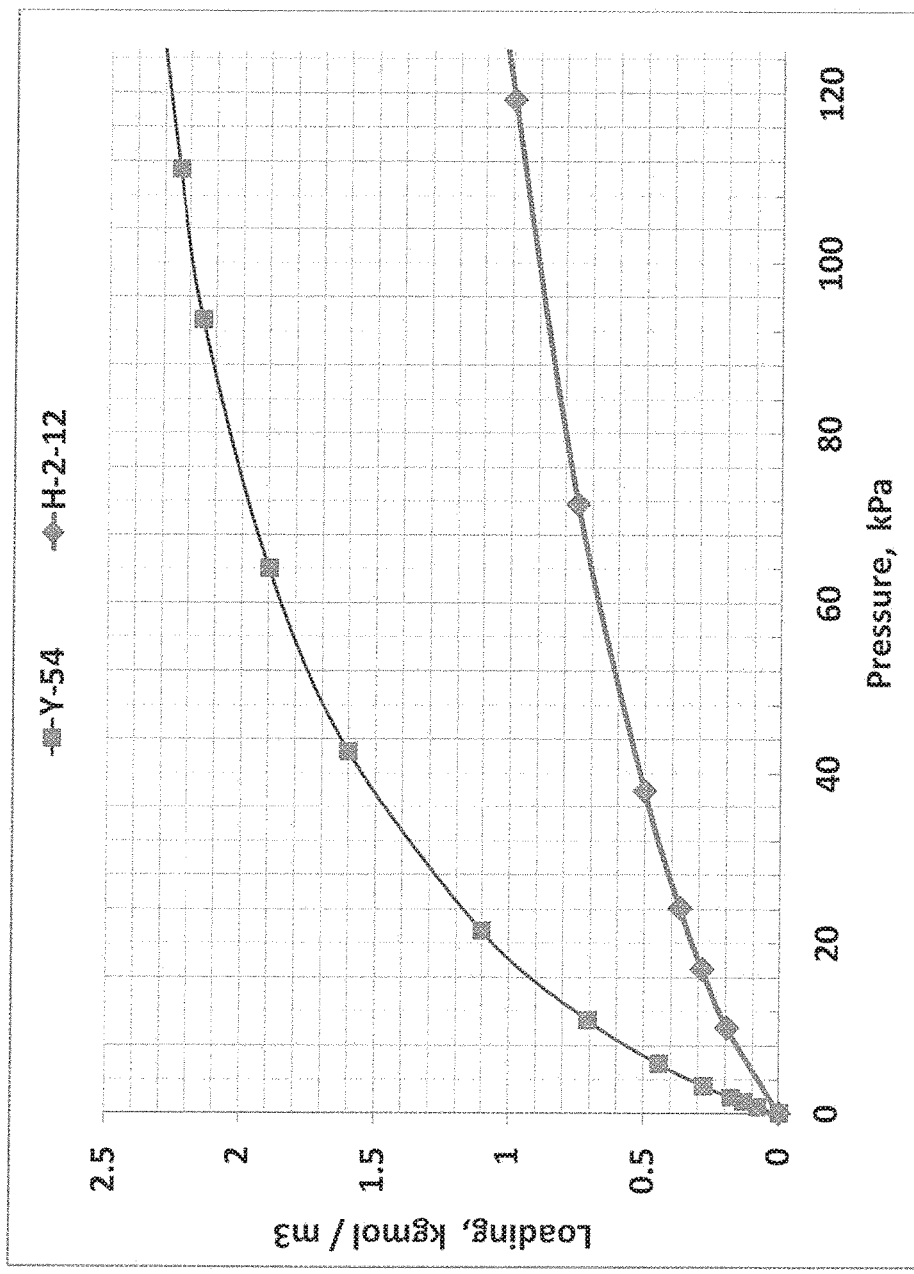
FIG. 2 illustrates equilibrium isotherms for $CO_2$ at 40° C. corresponding to an exemplary bed loadings.

In an exemplary case study, a comparison was made of the multilayer adsorbent bed prepared according to the instant invention, wherein the first adsorbent section included an activated carbon layer occupying a volume fraction of 45%, the second adsorbent section included a NaY zeolite molecular sieve occupying a volume fraction of 15%, and the third adsorbent section having a NaX zeolite molecular sieve occupying a volume fraction of 40% of the multilayer adsorbent bed, with a reference bed. The reference bed included an activated carbon layer occupying a volume fraction of 65% and a NaX zeolite molecular sieve layer occupying a volume fraction of 35% of the reference multilayer bed. A steam reformer feed gas including predominantly hydrogen was passed through the multilayer adsorbent bed in accordance with the instant invention and through the reference bed. Applicants found that using a NaY sieve in the instant multilayer adsorbent bed has a higher equilibrium loading for $CO_2$ compared to activated carbon as shown in FIG. 2. In this section of the bed, the working capacity i.e. pounds of $CO_2$ adsorbed per cubic foot of loaded adsorbent as represented on the Y-axis is measured against $CO_2$ partial pressure between 1 psia and 10 psia represented on X-axis in FIG. 2. As shown in the Figure, the working capacity of the NaY sieve, represented by the curve corresponding to Y-54, is 2.5 times greater than the commercial activated carbon represented by the curve corresponding to H-2-12 in FIG. 2. This provides improved $CO_2$ polishing and provides better protection for the NaX section against $CO_2$ migration. As a result, the carbon section was decreased as compared to the reference bed and more NaX sieve can be used in the instant multilayer adsorbent bed. This improves the overall performance of the hydrogen PSA unit, i.e. higher hydrogen recovery at a given product purity specification of 10 ppmv CO. Measured values of the $CO_2$ removal efficiency during cyclic operation in PSA pilot plant are given in Table 1 below, where the improved performance of NaY compared to activated carbon is evident.

TABLE 1

Measured CO2 concentration (mol %) in pilot plant bed during PSA cycle, corresponding to the bed loadings of the instant example (maximum values during PSA cycle).

| Axial Bed Position, % | Activated Carbon | NaY |
|---|---|---|
| 54 | 4.8 | 0.12 |
| 63 | 0.29 | — |

Figure 3:
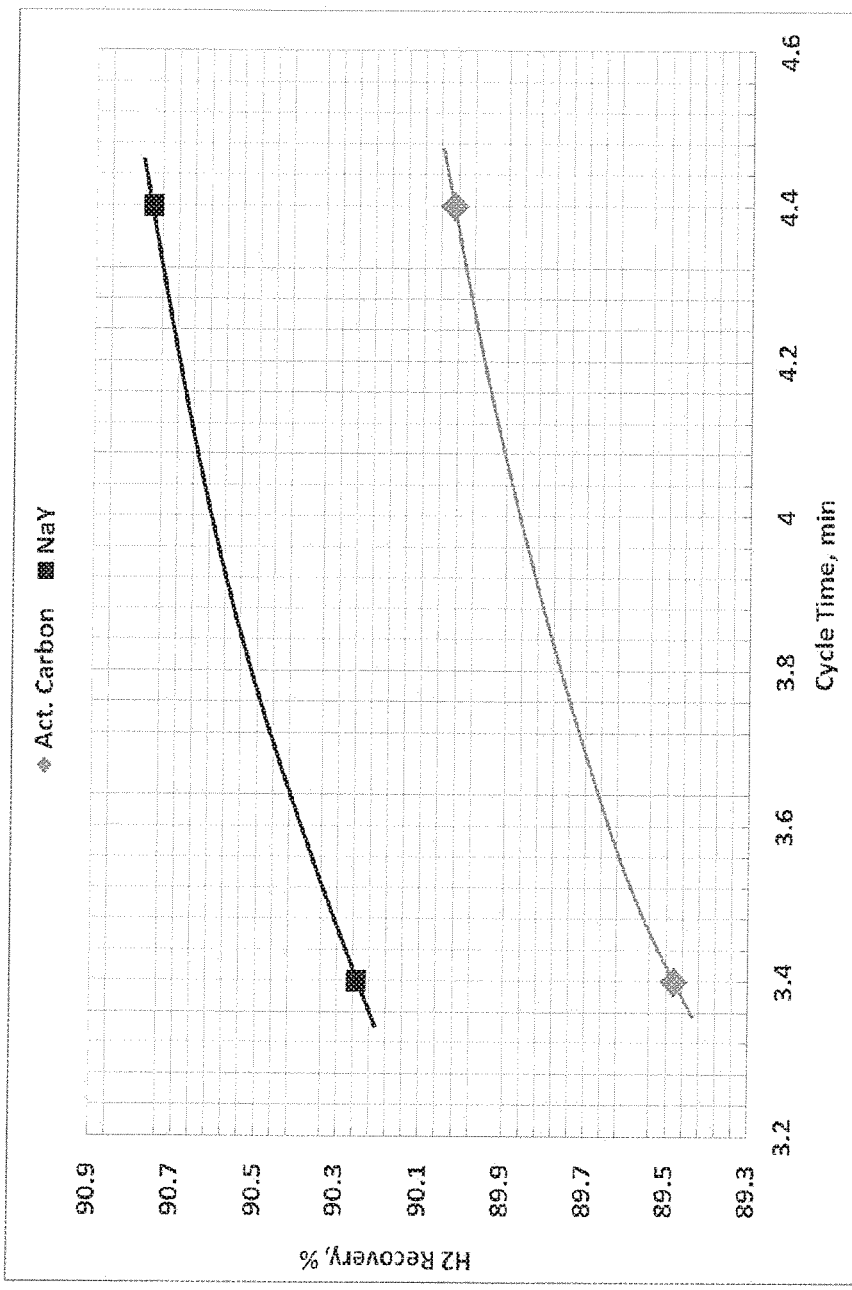
FIG. 3 shows PSA performance in pilot plant corresponding to exemplary bed loadings.

The measured performance with the bed loading according to multilayer adsorbent bed according to the instant invention compared to the reference bed loading is represented in FIG. 3. The gain in recovery is very significant with the multilayer adsorbent bed of the instant invention as compared to the reference bed as is clear from curves representing NaY and activated carbon, respectively in the figure.

Specific Embodiments

While the following is described in conjunction with specific embodiments, it will be understood that this description is intended to illustrate and not limit the scope of the preceding description and the appended claims.

A first embodiment of the invention is a multilayer adsorbent bed for purifying a feed stream comprising $CO_2$, at least one of $N_2$, $H_2O$, $CH_4$ and CO, and more than 50 mole % hydrogen comprising a) a first adsorbent section comprising an activated carbon layer and occupying a volume fraction of about 20 to about 50% of the multilayer adsorbent bed; b) a second adsorbent section comprising a layer of molecular sieve of the faujasite structure type with a Si/Al atomic ratio of from 1.5 to 8.0 and occupying a volume fraction of about 10 to about 25% of the multilayer adsorbent bed; and c) a third adsorbent section comprising a layer of molecular sieve of the faujasite structure type with a Si/Al atomic ratio of from 1.0 to 1.5 and occupying a volume fraction of about 30 to about 60% of the multilayer adsorbent bed wherein the second adsorbent section is present between the first adsorbent section and the third adsorbent section. An embodiment of the invention is one, any or all of prior embodiments in this paragraph up through the first embodiment in this paragraph, wherein the first section, the second section and the third section occupy a volume fraction of about 45%, about 15% and about 40% respectively, of the multilayer adsorbent bed. An embodiment of the invention is one, any or all of prior embodiments in this paragraph up through the first embodiment in this paragraph, wherein the first adsorbent section further comprises at least one of a silica gel layer and an activated alumina layer. An embodiment of the invention is one, any or all of prior embodiments in this paragraph up through the first embodiment in this paragraph, wherein the molecular sieve in the second adsorbent section is a NaY zeolite molecular sieve. An embodiment of the invention is one, any or all of prior embodiments in this paragraph up through the first embodiment in this paragraph, wherein the molecular sieve in the third adsorbent section is one of a NaX zeolite molecular sieve and a CaX zeolite molecular sieve.

A second embodiment of the invention is a pressure swing adsorption process for purifying a feed stream comprising $CO_2$, at least one of $N_2$, $H_2O$, $CH_4$ and CO, and more than 50 mole % hydrogen, the method comprising passing the feed stream at an adsorption pressure of about 1500 kPa to about 3500 kPa, through a multilayer adsorbent bed comprising a first adsorbent section, a second adsorbent section downstream from the first adsorbent section and a third adsorbent section downstream from the second adsorbent section, the first adsorbent section comprising an activated carbon layer, the second adsorbent section comprising a layer of molecular sieve of the faujasite structure type with a Si/Al atomic ratio of from 1.5 to 8.0 and the third adsorbent section comprising a layer of molecular sieve of the faujasite structure type with a Si/Al atomic ratio of from 1.0 to 1.5, wherein the at least one of the $N_2$, $CO_2$, $CH_4$ and CO is adsorbed from the feed stream and a purified hydrogen product is recovered from the multilayer adsorbent bed. An embodiment of the invention is one, any or all of prior embodiments in this paragraph up through the second embodiment in this paragraph, wherein the first adsorbent section, the second adsorbent section and the third adsorbent section occupy a volume fraction of about 20 to about 50%, about 10 to about 25%, about 30 to about 60% respectively, of the multilayer adsorbent bed. An embodiment of the invention is one, any or all of prior embodiments in this paragraph up through the second embodiment in this paragraph, wherein the first adsorbent section, the second adsorbent section and the third adsorbent section occupy a volume fraction of about 45%, about 15% and about 40% respectively, of the multilayer adsorbent bed. An embodiment of the invention is one, any or all of prior embodiments in this paragraph up through the second embodiment in this paragraph, wherein the molecular sieve in the second adsorbent section is a NaY zeolite molecular sieve. An embodiment of the invention is one, any or all of prior embodiments in this paragraph up through the second embodiment in this paragraph, wherein the molecular sieve in the third adsorbent section is one of a NaX zeolite molecular sieve and a CaX zeolite molecular sieve. An embodiment of the invention is one, any or all of prior embodiments in this paragraph up through the second embodiment in this paragraph, wherein the purity of the purified hydrogen product is greater than about 99.9 mol %. An embodiment of the invention is one, any or all of prior embodiments in this paragraph up through the second embodiment in this paragraph, wherein the feed stream comprises about 10 to about 20 mol % $CO_2$, about 1% to about 10 mol % $CH_4$, about 1 to about 10 mol % CO and no more than about 2 mol % $N_2$. An embodiment of the invention is one, any or all of prior embodiments in this paragraph up through the second embodiment in this paragraph, wherein the first adsorbent section adsorbs at least one of $CO_2$ and $CH_4$, the second adsorbent section adsorbs $CO_2$ and the third adsorbent section adsorbs at least one of CO and $N_2$ present in the feed stream. An embodiment of the invention is one, any or all of prior embodiments in this paragraph up through the second embodiment in this paragraph further comprising a regeneration step to desorb the at least one $N_2$, $CO_2$, $CH_4$ and CO from the multilayer adsorbent bed, wherein the desorption is performed by a reduction in pressure to a pressure lower than the adsorption pressure and by counter-current purging with a purified hydrogen stream.

A third embodiment of the invention is a pressure swing adsorption apparatus for purifying a feed stream comprising CO2, at least one of $N_2$, $H_2O$, $CH_4$ and CO, and more than 50 mole % hydrogen, wherein the apparatus comprises a feed end for the introduction of the feed stream thereto, a product end for the recovery of purified feed stream therefrom and a multilayer adsorbent bed comprising a first adsorbent section, a second adsorbent section downstream from the first adsorbent section and a third adsorbent section downstream from the second adsorbent section, the first adsorbent section comprising an activated carbon layer, the second adsorbent section comprising a layer of molecular sieve of the faujasite structure type with a Si/Al atomic ratio of from 1.5 to 8.0 and the third adsorbent section comprising a layer of molecular sieve of the faujasite structure type with a Si/Al atomic ratio of from 1.0 to 1.5. An embodiment of the invention is one, any or all of prior embodiments in this paragraph up through the third embodiment in this paragraph, wherein the first adsorbent section, the second adsorbent section and the third adsorbent section occupy a volume fraction of about 20 to about 50%, about 10 to about 25%, about 30 to about 60% respectively, of the multilayer adsorbent bed. An embodiment of the invention is one, any or all of prior embodiments in this paragraph up through the third embodiment in this paragraph, wherein the first adsorbent section, the second adsorbent section and the third adsorbent section occupy a volume fraction of about 45%, about 15% and about 40% respectively, of the multilayer adsorbent bed. An embodiment of the invention is one, any or all of prior embodiments in this paragraph up through the third embodiment in this paragraph, wherein the first adsorbent section further comprises at least one of a silica gel layer and activated alumina layer. An embodiment of the invention is one, any or all of prior embodiments in this paragraph up through the third embodiment in this paragraph, wherein the molecular sieve in the second adsorbent section is a NaY zeolite molecular sieve. An embodiment of the invention is one, any or all of prior embodiments in this paragraph up through the third embodiment in this paragraph, wherein the molecular sieve in the third adsorbent section is at one of a NaX zeolite molecular sieve and a CaX zeolite molecular sieve.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by volume (mole), unless otherwise indicated.

The invention claimed is:

1. A multilayer adsorbent bed for purifying a feed stream comprising $CO_2$, at least one of $N_2$, $H_2O$, $CH_4$ and CO, and more than 50 mole % hydrogen comprising:
   a) a first adsorbent section comprising an activated carbon layer and occupying a volume fraction of about 20 to about 50% of the multilayer adsorbent bed;
   b) a second adsorbent section comprising a layer of molecular sieve of the faujasite structure type with a Si/Al atomic ratio of from 1.5 to 8.0 and occupying a volume fraction of about 10 to about 25% of the multilayer adsorbent bed; and
   c) a third adsorbent section comprising a layer of molecular sieve of the faujasite structure type with a Si/Al atomic ratio of from 1.0 to 1.5 and occupying a volume fraction of about 30 to about 60% of the multilayer adsorbent bed wherein the second adsorbent section is present between the first adsorbent section and the third adsorbent section.

2. The multilayer adsorbent bed of claim 1, wherein the first section, the second section and the third section occupy a volume fraction of about 45%, about 15% and about 40% respectively, of the multilayer adsorbent bed.

3. The multilayer adsorbent bed of claim 1, wherein the first adsorbent section further comprises at least one of a silica gel layer and an activated alumina layer.

4. The multilayer adsorbent bed of claim 1, wherein the molecular sieve in the second adsorbent section is a NaY zeolite molecular sieve.

5. The multilayer adsorbent bed of claim 1, wherein the molecular sieve in the third adsorbent section is selected from the group consisting of a NaX zeolite molecular sieve and a CaX zeolite molecular sieve.

6. A pressure swing adsorption process for purifying a feed stream comprising $CO_2$, at least one of $N_2$, $H_2O$, $CH_4$ and CO, and more than 50 mole % hydrogen, the method comprising passing the feed stream at an adsorption pressure of about 1500 kPa to about 3500 kPa, through a multilayer adsorbent bed comprising a first adsorbent section, a second adsorbent section downstream from the first adsorbent section and a third adsorbent section downstream from the second adsorbent section, the first adsorbent section comprising an activated carbon layer, the second adsorbent section comprising a layer of molecular sieve of the faujasite structure type with a Si/Al atomic ratio of from 1.5 to 8.0 and the third adsorbent section comprising a layer of molecular sieve of the faujasite structure type with a Si/Al atomic ratio of from 1.0 to 1.5, wherein the at least one of said $N_2$, $CO_2$, $CH_4$ and CO is adsorbed from the feed stream and a purified hydrogen product is recovered from the multilayer adsorbent bed.

7. The pressure swing adsorption process of claim 6, wherein the first adsorbent section, the second adsorbent section and the third adsorbent section occupy a volume fraction of about 20 to about 50%, about 10 to about 25%, about 30 to about 60% respectively, of the multilayer adsorbent bed.

8. The pressure swing adsorption process of claim 6, wherein the first adsorbent section, the second adsorbent section and the third adsorbent section occupy a volume fraction of about 45%, about 15% and about 40% respectively, of the multilayer adsorbent bed.

9. The pressure swing adsorption process of claim 6, wherein the molecular sieve in the second adsorbent section is a NaY zeolite molecular sieve.

10. The pressure swing adsorption process of claim 6, wherein the molecular sieve in the third adsorbent section is selected from the group consisting of a NaX zeolite molecular sieve and a CaX zeolite molecular sieve.

11. The pressure swing adsorption process of claim 6, wherein the purity of the purified hydrogen product is greater than about 99.9 mol %.

12. The pressure swing adsorption process of claim 6, wherein the feed stream comprises about 10 to about 20 mol % CO2, about 1% to about 10 mol % CH4, about 1 to about 10 mol % CO and no more than about 2 mol % N2.

13. The pressure swing adsorption process of claim 6, wherein the first adsorbent section adsorbs at least one of CO2 and CH4, the second adsorbent section adsorbs CO2 and the third adsorbent section adsorbs at least one of CO and N2 present in the feed stream.

14. The pressure swing adsorption process of claim 6 further comprising a regeneration step to desorb the at least one N2, CO2, CH4 and CO from the multilayer adsorbent bed, wherein the desorption is performed by a reduction in pressure to a pressure lower than the adsorption pressure and by counter-current purging with a purified hydrogen stream.

15. A pressure swing adsorption apparatus for purifying a feed stream comprising CO2, at least one of N2, H2O, CH4 and CO, and more than 50 mole % hydrogen, wherein said apparatus comprises a feed end for the introduction of said feed stream thereto, a product end for the recovery of purified feed stream therefrom and a multilayer adsorbent bed comprising a first adsorbent section, a second adsorbent section downstream from the first adsorbent section and a third adsorbent section downstream from the second adsorbent section, the first adsorbent section comprising an activated carbon layer, the second adsorbent section comprising a layer of molecular sieve of the faujasite structure type with a Si/Al atomic ratio of from 1.5 to 8.0 and the third adsorbent section comprising a layer of molecular sieve of the faujasite structure type with a Si/Al atomic ratio of from 1.0 to 1.5.

16. The pressure swing adsorption apparatus of claim 15, wherein the first adsorbent section, the second adsorbent section and the third adsorbent section occupy a volume fraction of about 20 to about 50%, about 10 to about 25%, about 30 to about 60% respectively, of the multilayer adsorbent bed.

17. The pressure swing adsorption apparatus of claim 15, wherein the first adsorbent section, the second adsorbent section and the third adsorbent section occupy a volume fraction of about 45%, about 15% and about 40% respectively, of the multilayer adsorbent bed.

18. The pressure swing adsorption apparatus of claim 15, wherein the first adsorbent section further comprises at least one of a silica gel layer and activated alumina layer.

19. The pressure swing adsorption apparatus of claim 15, wherein the molecular sieve in the second adsorbent section is a NaY zeolite molecular sieve.

20. The pressure swing adsorption apparatus of claim 15, wherein the molecular sieve in the third adsorbent section is selected from the group consisting of a NaX zeolite molecular sieve and a CaX zeolite molecular sieve.

* * * * *